United States Patent
Börger (10) Patent No.: US 9,260,070 B2
(45) Date of Patent: Feb. 16, 2016

(54) ENERGY-ABSORBING SUPPORT STRUCTURE AND METHOD FOR THE PRODUCTION THEREOF

(71) Applicant: THERMOPLAST COMPOSITE GMBH, Langenfeld (DE)

(72) Inventor: Herbert Börger, Langenfeld (DE)

(73) Assignee: THERMOPLAST COMPOSITE GMBH, Langenfeld (DE)

( * ) Notice: Subject to any disclaimer, the term of this patent is extended or adjusted under 35 U.S.C. 154(b) by 0 days.

(21) Appl. No.: 14/371,832

(22) PCT Filed: Jan. 9, 2013

(86) PCT No.: PCT/EP2013/050241
§ 371 (c)(1),
(2) Date: Jul. 11, 2014

(87) PCT Pub. No.: WO2013/104635
PCT Pub. Date: Jul. 18, 2013

(65) Prior Publication Data
US 2014/0361562 A1  Dec. 11, 2014

(30) Foreign Application Priority Data

Jan. 12, 2012 (DE) .......................... 10 2012 200 410

(51) Int. Cl.
*B60R 19/34* (2006.01)
*B29C 45/14* (2006.01)

(52) U.S. Cl.
CPC ........... *B60R 19/34* (2013.01); *B29C 45/14467* (2013.01)

(58) Field of Classification Search
CPC ........ Y02E 10/44; Y02E 10/47; Y02B 10/20; E04B 2001/748; E04B 2001/8452; A61F 2013/53445; A61F 2013/530481; A61F 13/534; A61L 15/26; B62D 1/195
USPC ................. 293/133, 1; 180/90; 280/784, 777; 267/140, 219, 140.13; 52/145
See application file for complete search history.

(56) References Cited

U.S. PATENT DOCUMENTS

| 3,547,463 A | 12/1970 | Eggert |
| 4,023,652 A * | 5/1977 | Torke ........................ F16F 7/12 188/377 |

(Continued)

FOREIGN PATENT DOCUMENTS

| DE | 1 933 149 A1 | 2/1970 |
| DE | 38 39 059 A1 | 5/1990 |

(Continued)

*Primary Examiner* — Kiran B Patel
(74) *Attorney, Agent, or Firm* — McGlew and Tuttle, P.C.

(57) ABSTRACT

An energy-absorbing support structure has an absorbing body including a fiber-reinforced plastics material. The latter is arranged between a support structure abutment component and a support structure impact-absorbing component. The absorbing body absorbs energy by deforming from a starting state into a deformed deformation state based on an impact-induced relative displacement of the support structure components, the energy being introduced into the support structure by an impact. The absorbing body is configured as a body which has already been predeformed in the starting state by energy absorption compared to an original state. During production of the support structure, the absorbing body is firstly produced in the original state, the latter is then predeformed into the starting state and finally the absorbing body is connected to the support structure components. The result is a support structure which absorbs energy in a predictable and defined manner upon an impact-induced introduction of energy.

7 Claims, 5 Drawing Sheets

(56) References Cited

U.S. PATENT DOCUMENTS

| | | | | |
|---|---|---|---|---|
| 4,061,386 | A * | 12/1977 | Chupick | B60R 19/26 293/134 |
| 4,097,080 | A * | 6/1978 | Petry | B60R 19/32 293/134 |
| 4,531,619 | A * | 7/1985 | Eckels | F16F 7/123 188/371 |
| 5,090,755 | A * | 2/1992 | Garnweidner | F16F 7/127 188/375 |
| 6,523,873 | B1 * | 2/2003 | Summe | F16F 7/125 293/102 |
| 6,601,886 | B1 * | 8/2003 | Thayer | B60R 19/34 188/375 |
| 6,871,889 | B2 * | 3/2005 | Ericsson | B60R 19/28 293/120 |
| 7,357,445 | B2 * | 4/2008 | Gross | B62D 21/152 188/377 |
| 7,393,030 | B2 * | 7/2008 | Steeg | F16F 7/126 293/120 |
| 7,484,781 | B1 | 2/2009 | Garber et al. | |
| 7,654,368 | B2 * | 2/2010 | Wacker | F16F 7/12 188/371 |
| 7,748,507 | B2 * | 7/2010 | Canot | B62D 21/152 188/377 |
| 8,123,263 | B2 * | 2/2012 | Evans | B60R 19/18 293/132 |
| 8,348,032 | B2 | 1/2013 | Jacob et al. | |
| 8,857,894 | B2 * | 10/2014 | Grall | B60R 19/34 188/377 |
| 9,126,551 | B2 * | 9/2015 | Impero | B60R 19/34 |
| 2004/0201256 | A1 * | 10/2004 | Caliskan | B62D 21/15 296/187.08 |
| 2012/0228888 | A1 | 9/2012 | Krammer et al. | |

FOREIGN PATENT DOCUMENTS

| | | |
|---|---|---|
| DE | 603 00 496 T2 | 2/2006 |
| DE | 20 2005 010 964 U1 | 11/2006 |
| DE | 10 2006 058 604 A1 | 6/2008 |
| EP | 1 366 960 A1 | 12/2003 |
| EP | 1 464 547 A1 | 10/2004 |
| EP | 1 607 272 B1 | 12/2005 |
| EP | 1 744 077 A1 | 1/2007 |
| EP | 2 335 983 A2 | 6/2011 |
| FR | 2 657 130 A1 | 7/1991 |
| WO | 2011/058152 A1 | 5/2011 |

* cited by examiner

ENERGY-ABSORBING SUPPORT STRUCTURE AND METHOD FOR THE PRODUCTION THEREOF

CROSS REFERENCE TO RELATED APPLICATIONS

This application is a United States National Phase application of International Application PCT/EP2013/050241 filed Jan. 9, 2013 and claims the benefit of priority under 35 U.S.C. §119 of German Patent Application Serial No. DE 10 2012 200 410.6 filed Jan. 12, 2012, the entire contents of which are incorporated herein by reference.

FIELD OF THE INVENTION

The invention relates to an energy-absorbing support structure with an absorbing body consisting of a fiber-reinforced plastics material, which is arranged between a support structure abutment component and a support structure impact-absorbing component, wherein the absorbing body is configured in such a way that it absorbs energy by deforming from a starting state into a deformed deformation state on the basis of an impact-induced relative displacement of the support structure components, said energy being introduced into the support structure by an impact. Furthermore, the invention relates to a method for producing an energy-absorbing support structure.

BACKGROUND OF THE INVENTION

Energy-absorbing support structures, in particular for the bumper or bumper bar area of a motor vehicle, are known from EP 1 464 547 A1, DE 38 39 059 A1, DE 603 00 496 T2, EP 1 607 272 B1, EP 1744 077 A1, EP 2 335 983 A2, WO 2011/058152 A1, DE-PS 1 933 149 and DE 10 2006 058 604 A1.

SUMMARY OF THE INVENTION

An object of the present invention is to develop an energy-absorbing support structure based on an absorbing body consisting of fiber-reinforced plastics or synthetic material in such a way that it absorbs energy in a predictable and defined manner upon an impact-induced introduction of energy into the support structure. A further object of the invention is to disclose a production method for a support structure of this type.

This object is achieved according to the invention by a support structure with an absorbing body consisting of a fiber-reinforced plastics material, which is arranged between a support structure abutment component and a support structure impact-absorbing component, wherein the absorbing body is configured in such a way that it absorbs energy by deforming from a starting state into a deformed deformation state on the basis of an impact-induced relative displacement of the support structure components, said energy being introduced into the support structure by an impact, wherein the absorbing body is designed as a body which, in the starting state, has already been predeformed by energy absorption compared to an original state.

It was recognized according to the invention that a predeformation of the absorbing body leads to very defined force introduction and therefore energy absorption ratios when an impact is introduced into the support structure. As a result, the energy absorption potential of the fiber-reinforced plastics material can be utilized in a predictable and defined manner. A high specific energy absorption of the fiber-reinforced plastics material in the range of, for example, 50 kJ/kg to 120 kJ/kg can be utilized, which is significantly higher than in the case of comparable metallic absorbing bodies. An undesired, undefined force-path dependency in the starting region of the deformation of the absorbing body from its original state is then avoided in the event of an impact. A very large length proportion of the absorbing body can be used for deformation from the starting state into the deformation state, for example 85% of the total length of the absorbing body between the support structure components. The support structure impact-absorbing component of the energy-absorbing support structure can be configured as a bumper or bumper bar on a motor vehicle. The absorbing body may be tubular. A tubular absorbing body may be configured with a round or with an oval or elliptical cross section. The absorbing body can be configured with a square, rectangular or else with a polygonal cross section, for example a triangular or more than a quadrangular cross section. The absorbing body may be non-positively integrated into the support structure and can also bear all dynamic and static loads, in particular also tensile and transverse forces, to an unlimited extent. If the support structure is used in a motor vehicle, the absorbing body may, for example, also be used to absorb towing forces. The support structure may be used in automotive engineering. Alternatively, the support structure can also be used as a structural component of aircraft, for example of aircraft or helicopters, lifts or also of buildings. In the latter case, the support structure may be part of an earthquake protection system. The absorbing body may consist exclusively of the fiber-reinforced plastics material.

An absorbing body configured as a body deformed by delamination deforms in a defined manner. The energy absorption can be finely influenced by means of the respective delamination conditions, for example by means of the wall thickness of the absorbing body and/or by means of the design of a delamination body acting, for example, as a blade. The function of a delamination body may also be adopted by one of the support structure components, between which the absorbing body is arranged. A design of the delamination body as a blade is not imperative. The delamination body only has to be designed in such a way that, to continue the delamination, it is supported on the predeformed absorbing body.

To achieve delamination properties that can be used for the energy absorption, a wall thickness of the absorbing body has to exceed a certain lower limit. This lower limit is selected in such a way that a delamination force for the absorbing body is less than a potential bending force, so that it is thus ensured that the absorbing body is deformed by means of a delamination and not by means of buckling upon an impact loading. A lower limit for the wall thickness in the case of a tubular absorbing body with a diameter of about 20 mm to 25 mm may be approximately 1.0 mm. With a tube diameter of the absorbing body of 70 mm, the lower limit for the wall thickness may be 1.4 mm. This applies to tube lengths in the region of 100 mm.

The same applies to an absorbing body which is configured in such a way that an energy absorption takes place during the deformation between the starting state and the deformation state by delamination.

A trigger structure of the absorbing body which predetermines the location of a predeformation of the absorbing body into the starting state ensures defined predeformation ratios.

A trigger structure formed as a chamfer of an end face of the absorbing body can be easily produced.

A support structure which has a plurality of absorbing bodies consisting of a fiber-reinforced plastics material, which are in each case arranged between a support structure abutment component and a support structure impact-absorbing component allows forces to be absorbed in various directions by the energy-absorbing support structure. The forces to be absorbed may be pure holding forces and/or impact-induced forces. At least one of the absorbing bodies is predeformed. Apart from the predeformed absorbing body, the further bodies consisting of fiber-reinforced plastics material may be used purely as holding structures and/or also as energy absorbers. The bodies consisting of fiber-reinforced plastics material may be designed in the manner of a trihedron. A larger number of bodies of this type consisting of fiber-reinforced plastics material within the energy-absorbing support structure are also possible.

An injection molding connection which connects the absorbing body to at least one of the support structure components makes it possible to connect a predeformed portion of the absorbing body to the support structure components without play in such a way that the impact-induced deformation of the absorbing body from the starting state into the deformation state starts immediately, in other words without dead paths between the support structure components. Completely defined energy absorption ratios are then present. In addition, defined connection ratios between the absorbing body and the support structure are also produced by the injection molding connection in the region of a predeformed portion of the absorbing body. The injection molding connection can be produced by encapsulation.

The advantages of a production method for producing a support structure according to the invention, the method having the steps of producing the absorbing body in the original state, predeforming the absorbing body into the starting state, and connecting the absorbing body to the support structure abutment component and the support structure impact-absorbing component correspond to those that have already been described above in conjunction with the absorbing body according to the invention.

The injection molding connection which connects the absorbing body to at least one of the support structure components by injection molding can, in particular, take place by means of an encapsulation of the absorbing body.

A predeformation of the absorbing body taking place with the aid of an injection molding tool can be elegantly integrated into the production process of the support structure.

A force measurement of a force required to predeform the absorbing body close to the starting state allows safe quality control during the production of the absorbing body and the support structure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1a is a side view of the energy-absorbing support structure of FIG. 1 after an impact force is applied to the energy-absorbing support structure;

DESCRIPTION OF THE PREFERRED EMBODIMENTS

Figure 1:
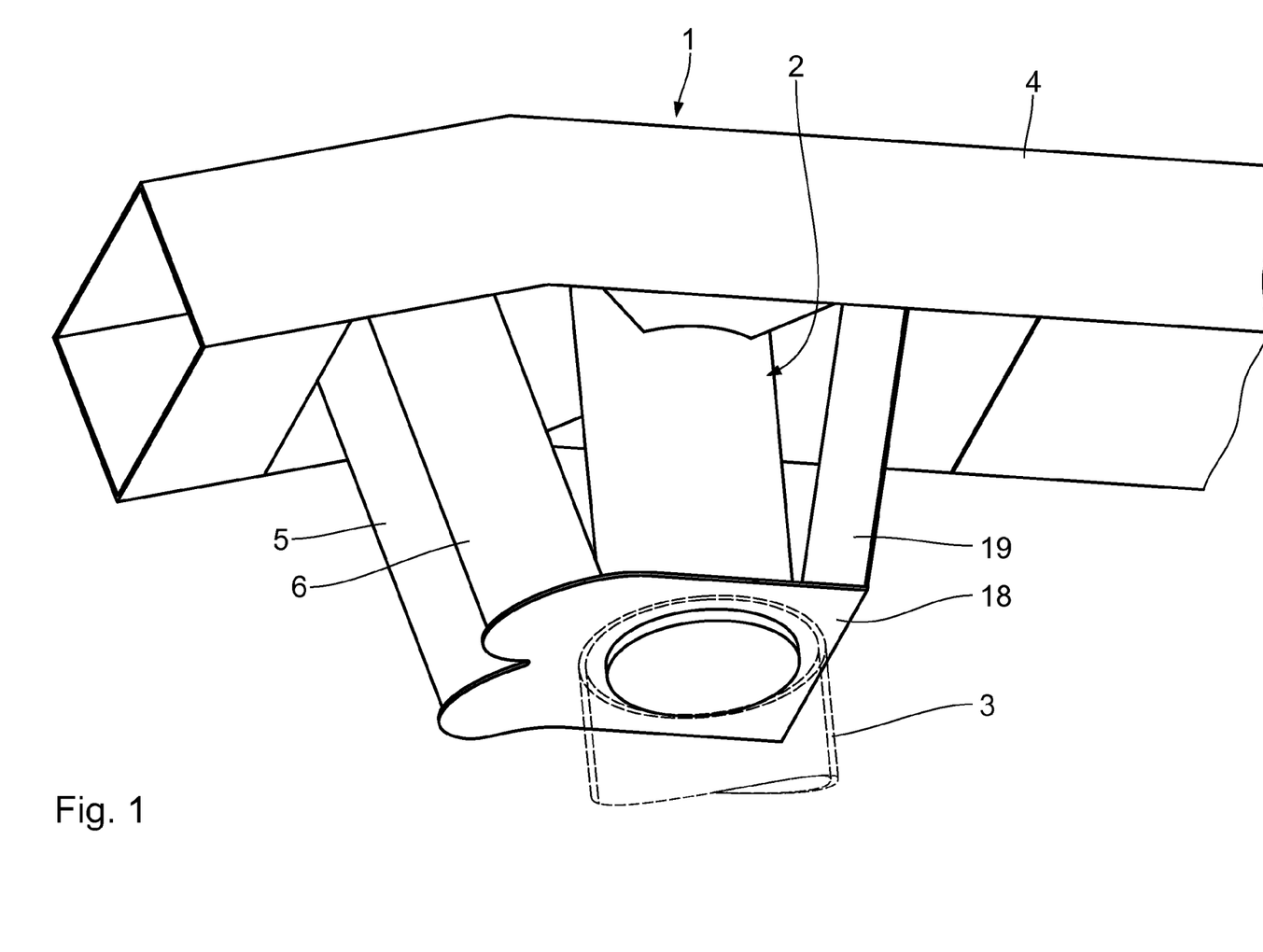
FIG. 1 is a perspective view of an energy-absorbing support structure with a predeformed absorbing body consisting of a fiber-reinforced plastics material, arranged between a support structure abutment component and a support structure impact-absorbing component.

FIG. 1 shows a portion of an energy-absorbing support structure 1, which may be a component of a motor vehicle. The support structure 1 has an absorbing body 2 made of a fiber-reinforced plastics material, which is arranged between a support structure abutment component 3, which may, for example, be a vehicle longitudinal member or a vehicle longitudinal member flange, and a support structure impact-absorbing component 4, which may be a bumper cross member or a bumper bar of the motor vehicle. The absorbing body 2 is tubular overall. A tubular main component of the support structure abutment component 3 is shown by dashed lines and broken in FIG. 1. The support structure abutment component 3 is tubular and may, as shown in FIG. 1, have a round or else an oval cross section. A cross section of the support structure abutment component 3, which is otherwise adapted to a structure surround of the support structure 1, is also possible.

Apart from the absorbing body 2, the support structure 1 also has two support bodies 5, 6, which are also produced from a fiber-reinforced plastics material and are also tubular. The support bodies 5, 6 have a smaller tube diameter than the absorbing body 2. The support bodies 5, 6 are arranged together with the absorbing body 2 in the manner of a tetrahedron. Longitudinal axes of the absorbing body 2, on the one hand, and of the support bodies 5, 6, on the other hand, point in various directions. The longitudinal axes of the support bodies 5 and 6 can also point in various directions.

The support bodies 5, 6 may also be configured as impact energy-absorbing absorbing bodies.

The support bodies 5, 6 also support the support structure impact-absorbing component 4 against the support structure abutment component 3.

The fiber-reinforced plastics material of the absorbing body 2 and of the support bodies 5, 6 is a fiber composite material with a fiber material, with a plastics material matrix, in which the fiber material is embedded, and with an adhesion promoter, with which the filaments of the fiber material are coated. The plastics material matrix is also called an impregnating polymer. The adhesion promoter is also called a sizing agent.

Glass fiber, carbon fiber, aramid, basalt, polyester or natural fiber may also be used as the fiber material. The fibers may be configured as continuous fibers. At least some of the fibers run along the absorbing body 2, in other words in the connection direction between the two support structure components 3, 4. In the case of a tubular absorbing body 2, a majority of the fibers in any case run in the axial direction. The fibers may be combined to form fiber bundles, in other words rovings.

A thermoplastic may be used the impregnating polymer or plastics material matrix. Examples of this are PE (polyethylene), PP (polypropylene), other polyolefins and blends of these polyolefins, SAN (styrene/acrylonitrile), PA (polyamide), for example PA 6, PA 6.6, PA 6.6T, PA 12, PA 6.10, ASA (acrylonitrile/styrene/acrylic ester), PC (polycarbonate), PBT (polybutylene terephthalate), PET (polyethylene terephthalate), PPS (polyphenylene sulfide), PSU (polysulfone), PES (polyethersulfone), PEEK (polyetheretherketone) or polymer blends, for example PC/PBT. A thermosetting plastic, which can be applied as a melt in the B-stage (resitol), can also be used as the impregnating polymer. The polymer polyoxymethylene (POM) or a mixture of polyoxymethylene (POM) and thermoplastic polyurethane (PUR) can also be selected for the plastics material matrix. These variants for the plastics material matrix lead to a rigid and robust matrix, which leads to a correspondingly high energy absorption possibility of the fiber composite material.

The absorbing body 2 is configured in such a way that it absorbs energy by deforming from a starting state, which is shown in FIG. 1, into a deformed deformation state on the basis of an impact-induced relative displacement of the support structure components 3, 4 in relation to one another, said energy being introduced into the support structure 1 by an impact. Upon an impact on the support structure impact-absorbing component 4, the impact energy of which is greater than a predetermined minimum value, the absorbing body 2 is thus deformed into the deformation state by an impact force F, which is shown in FIG. 1a. The support bodies 5, 6 can also be deformed in the process. This deformation takes place by delamination. During the deformation, an outer tube layer is peeled off from the remaining absorbing body 2. An outer layer of the absorbing body 2 detaches here from an inner layer of the absorbing body 2. This peeling off or delamination can happen because of the support of the absorbing body 2 between the two support structure components 3, 4. The use of a delamination body acting as a blade is unnecessary but basically possible.

The absorbing body 2 is configured as a body which has already been deformed in the starting state by energy absorption compared to an original state of the absorbing body 2. Both the deformation between the original state and the starting state during the predeformation and also an impact-induced deformation between the starting state and the deformation state take place by delamination.

Figure 2:
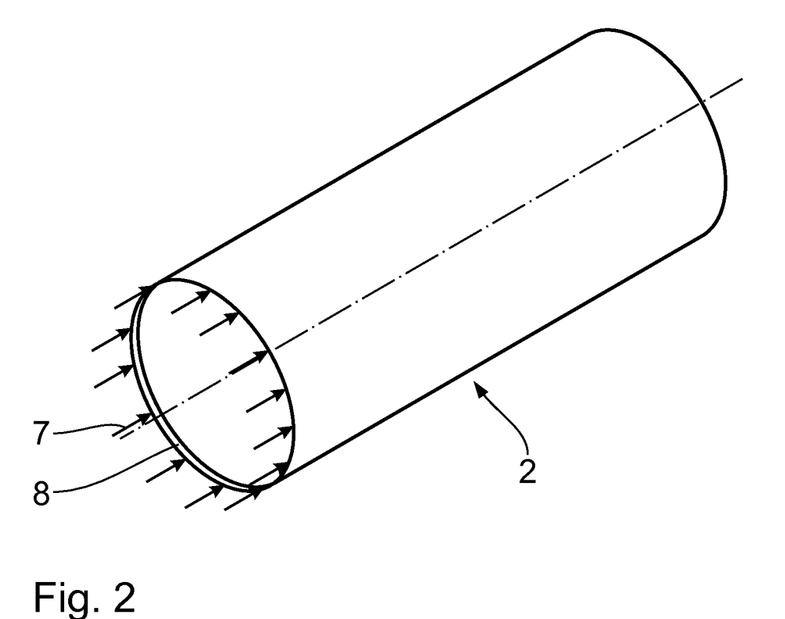
FIG. 2 is a perspective view of an absorbing body as a pre-deformed product during the production of the support structures according to FIG. 1, shown in an original state that has not yet been deformed.
Figure 3:
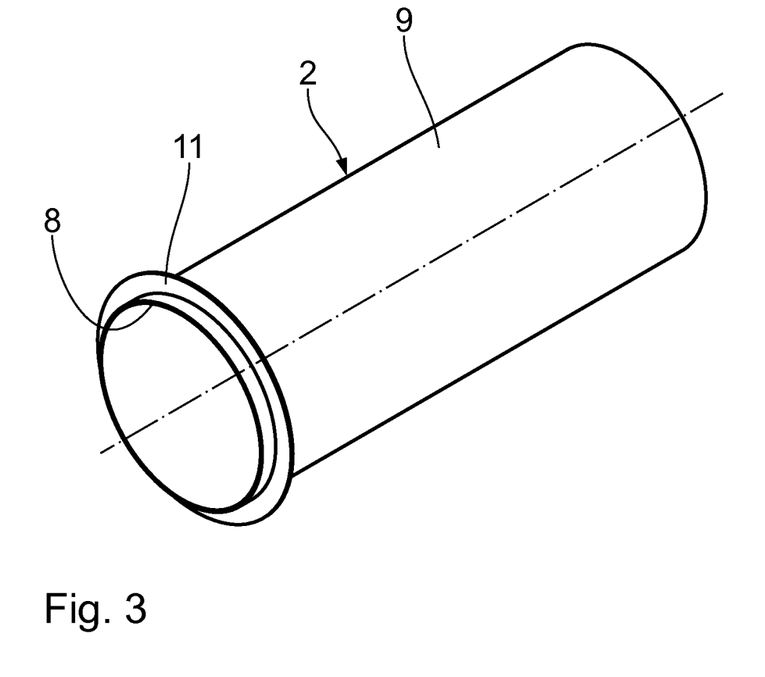
FIG. 3 is a perspective view of the absorbing body according to FIG. 2 after the predeformation.

FIGS. 2 and 3 show the process of predeformation. In FIG. 2, the absorbing body 2 is present in its original state. Proceeding from this, a predeformation force (force arrow 7) is exerted axially on the absorbing body 2. The absorbing body 2, on the end face, has a trigger structure 8, which predetermines where the absorbing body 2 is predeformed during the exertion of the predeformation force 7, which thus predetermines the location of a beginning of the predeformation. The trigger structure 8 is formed as a chamfer of an end face of the absorbing body 2, a 45° chamfer angle being present. The chamfer of the trigger structure 8 is such that, in the region of the trigger structure 8, an outer tube wall 9 of the absorbing body 2 projects on the end face beyond an inner tube wall 10 of the absorbing body 2.

FIG. 3 shows the absorbing body 2 in the predeformed starting state. Due to the predeformation force, which leads to a delamination of the absorbing body 2, an outer tube layer is peeled off from the absorbing body 2 adjacent to the trigger structure 8 so a deformation flange 11 has formed. The predeformation has taken place on the end face of the absorbing body 2 that has the trigger structure 8. This variant of the predeformation is also called a flange-like (pre)delamination.

Figure 4:
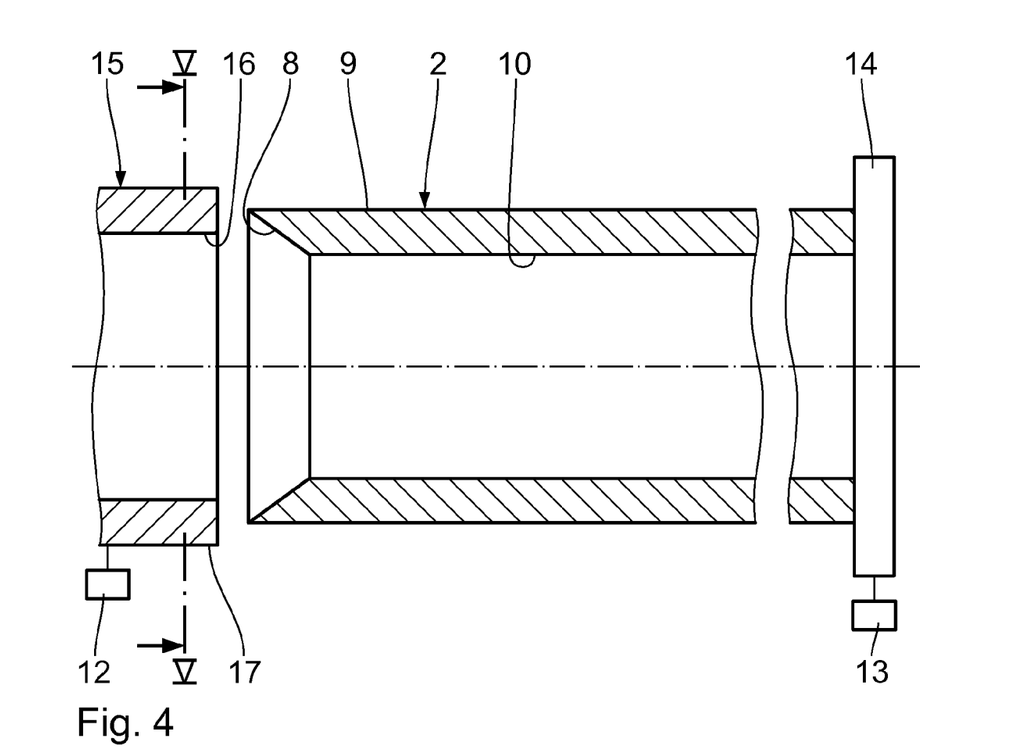
FIG. 4 is an axial longitudinal sectional view of the absorbing body according to FIG. 2, arranged between two tool components of an injection molding tool before the tool is closed.

The predeformation or predelamination of the absorbing body 2 as a method step in the production of the support structure 1 can take place in an injection molding tool with tool components or tool halves 12, 13, as will be described below with the aid of FIG. 4. The absorbing body 2 is shown there in an interrupted longitudinal section. The absorbing body 2 is supported by its non-chamfered end face, on the right in FIG. 4, on an abutment body 14 of the tool half 13. A tubular deformation or delamination body 15 of the tool half 12 is used for predeformation. During the predeformation, the deformation body 15 is placed coaxially on the end face of the absorbing body 2 having the trigger structure 8.

Figure 5:
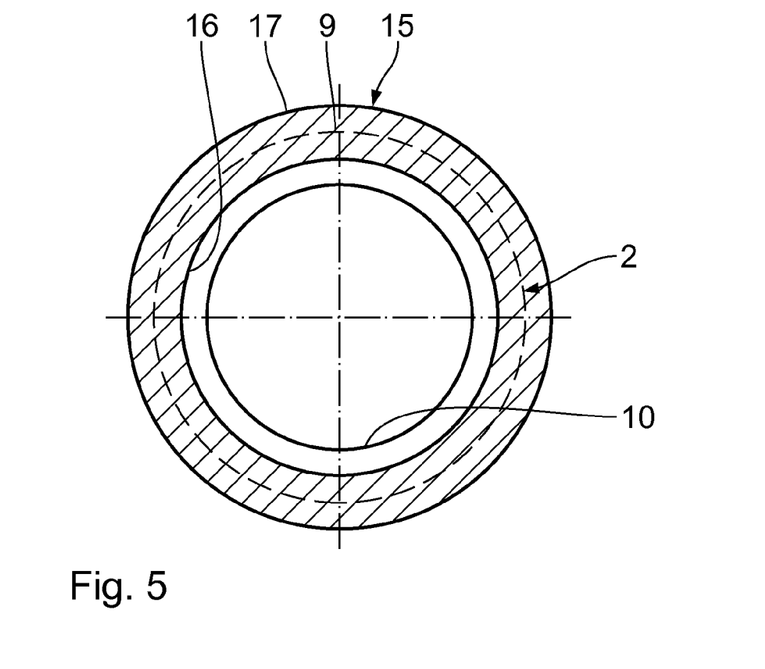
FIG. 5 is a cross sectional view along the line V-V in FIG. 4.

FIG. 5 illustrates the diameter ratios between the absorbing body 2, on the one hand, and the deformation body 15 on the other hand FIG. 5, which shows the tube cross section ratios, shows the deformation body 15 by continuous lines and the absorbing body 2 by dashed lines.

A diameter of the inner wall tube 10 of the absorbing body 2 is smaller than a diameter of an inner tube wall 16 of the deformation body 15. The diameter of the inner tube wall 16 of the deformation body 15 is smaller than a diameter of the outer tube wall 9 of the absorbing body 2. The diameter of the outer tube wall 9 of the absorbing body 2 is smaller than a diameter of an outer tube wall 17 of the deformation body 15.

Figure 6:
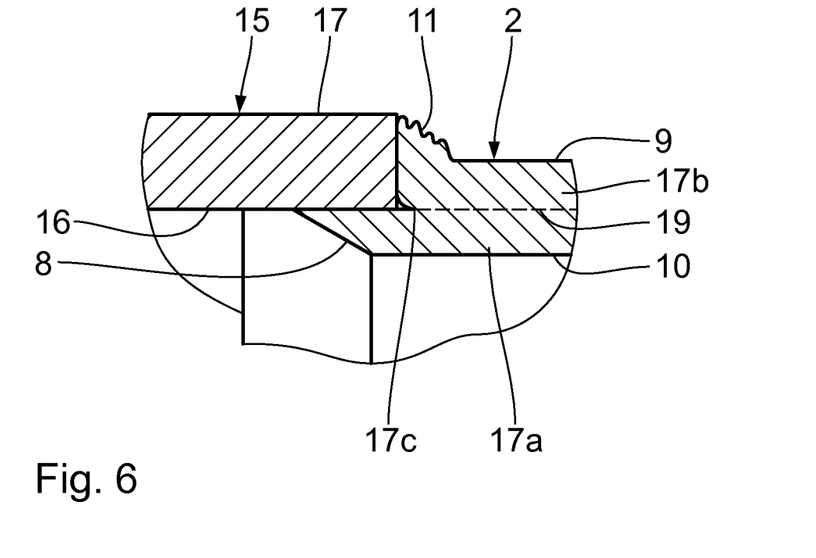
FIG. 6 is an axial longitudinal sectional view through an end-face portion of the initially predeformed absorbing body after the closing of the injection molding tool has begun.

When the injection molding tool with the tool halves 12, 13 is closed, the spacing between the deformation body 15 and the abutment body 14 is reduced such that the latter becomes smaller than an axial extent of the absorbing body 2. The deformation body 15 is then worked into the absorbing body 2. The trigger structure 8 causes the absorbing body 2 to be predeformed in the region of the trigger structure 8. This is illustrated section-wise in FIGS. 6 and 7. The deformation body 15 is shown there by dashed lines. FIG. 6 shows an initially predeformed state of the absorbing body 2. The deformation flange 11 is formed during the predeformation in the region of an end-face, leading face of the deformation body 15. A beginning tear front 17c has formed between an inner layer 17a and an outer layer 17b of the absorbing body 2, at which tear front the outer layer 17b tears off or peels off during delamination from the inner layer 17a with the formation of the deformation flange 11. A radial position of the tear front 17c is retained after the beginning of the formation of the tear front 17c. The absorbing body 2 remains undamaged in the region of the inner layer 17a and may, for example, continue to absorb transverse forces.

Figure 7:
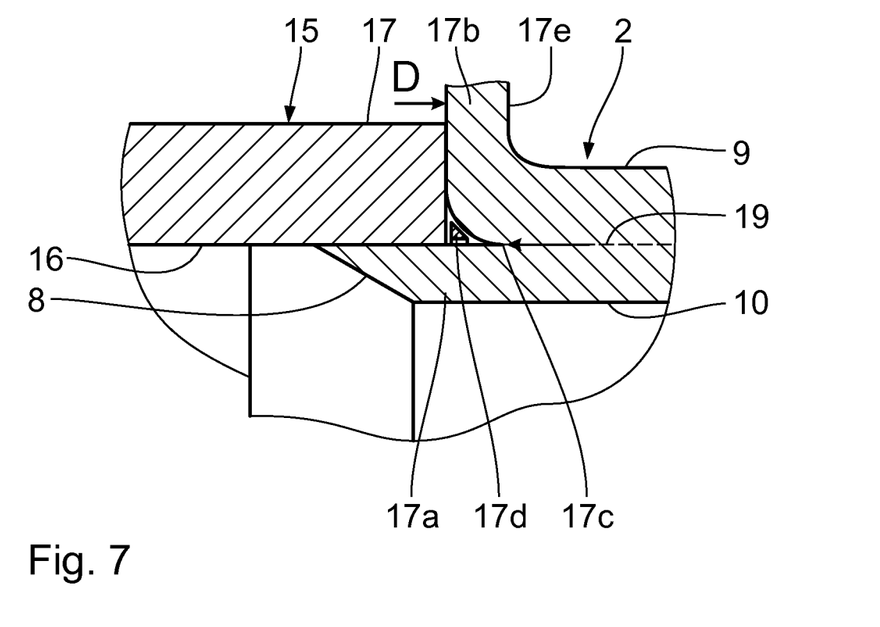
FIG. 7 is a sectional view, in a view similar to FIG. 6, of the end-face portion of the completely predeformed absorbing body after the closing of the injection molding tool has been completed.

FIG. 7 shows the situation when the predeformation is completed. The deformation body 15 has now advanced so far along the deformation direction D relative to the absorbing body 2 that the tear front 17c has completely formed. Accordingly, the delamination flange of the outer layer 17b has increased with respect to its radial extent. An undercut region 17e of the outer tube wall 9 of the absorbing body 2 can be used as an anchoring portion to connect the absorbing body 2 to a support structure component with the aid of the molding or adhesion method also described below. The undercut region 17e can also be used for anchoring in connection with another connection method, for example a welding or casting.

During the production of the support structure 1, the absorbing body 2 is firstly produced in the original state, as shown in FIG. 2. The absorbing body 2 in the original state may be produced as a continuous profiled body by a continuous method. During this production of the absorbing body 2 in the original state or following this, the absorbing body 2 receives the trigger structure 8 by chamfering on the end face. The absorbing body 2 is then predeformed, as shown in the sequence of FIGS. 4 and 6. The predeformation takes place along a deformation or delamination path $x_1$, which will be described in more detail below in conjunction with FIG. 7. The predeformation of the absorbing body 2 can take place when an injection molding tool is closed, as already described above. FIG. 6 in this case shows the situation during the closing of the injection molding tool and FIG. 7 shows the situation after the closing of the tool halves 12, 13 of the injection molding tool. Finally, the absorbing body 2 is connected, on the one hand, to the support structure abutment component 3 and, on the other hand, to the support structure impact-absorbing component 4. For this purpose, a non-predeformed portion of the absorbing body 2 is non-positively connected to the support structure impact-absorbing component 4 by means of a melt connection, in particular by an encapsulation, by means of an adhesive connection or by means of an interlocking fit.

The connection, in particular of a predeformed portion of the absorbing body 2 to these support structure components 3, 4, may take place by encapsulation in the molding tool with the tool halves 12, 13. For this purpose, the deformation body 15 of the molding tool can be axially drawn back again before the encapsulation of the absorbing body 2 with an impact deformation portion 18 of the support structure abutment component 3 so the absorbing body 2 is exposed in the region of the deformation flange 11 for encapsulation and can be completely encapsulated with the material of the impact deformation portion 18. Alternatively, it is possible for the impact deformation portion 18 to itself be the deformation body 15 as part of the molding tool in the form of an injection feeder. As an alternative to encapsulation, an adhesive connection of the deformed portion of the absorbing body 2 to the associated support structure component can also take place.

As an alternative to encapsulation, a welding of the absorbing body 2 to the support structure components or else an adhesion or casting may also take place.

In order to avoid connection material, such as, for example, plastics material melt or adhesive penetrating into a portion of the deformation flange 11 that is decisive for a continuation of the deformation of the absorbing body 2, in particular a deformation or delamination tear region can be protected by a covering body. A covering body of this type may, for example, be formed by a covering ring 17d, which is applied in the region of the deformation flange 11 on the absorbing body 2 in such a way that a deformation or delamination tear, in particular, is covered. A covering ring 17d of this type is indicated in FIG. 7 with a triangular cross section. The covering body may be produced from metal, from plastics material or from an elastomer.

A covering body of this type may simultaneously, during the production of the absorbing body 2 in the original state, form a limiting body to form the trigger structure 8. The covering body in this case may be configured as a ring with a cross sectional profile, which is designed to be complementary to the trigger structure 8. A covering ring of this type may also be used to predetermine defined predeformation ratios, without a trigger structure being formed on the absorbing body 2. In this case, the covering body or covering ring is simultaneously used as a predeformation body or predelamination body, which, when the injection molding tool is closed, penetrates, for example, with a profiled blade in an end face of the absorbing body 2 facing the latter and leads to a predeformation of the absorbing body 2. Apart from the predeformation, a covering body of this type then furthermore has the function of covering a deformation or delamination tear, as already stated above.

The impact deformation portion 18 may simultaneously be the delamination body of the support structure.

The impact deformation portion 18 is connected by an additional connection portion 19 to the support structure impact-absorbing component 4.

Figure 8:
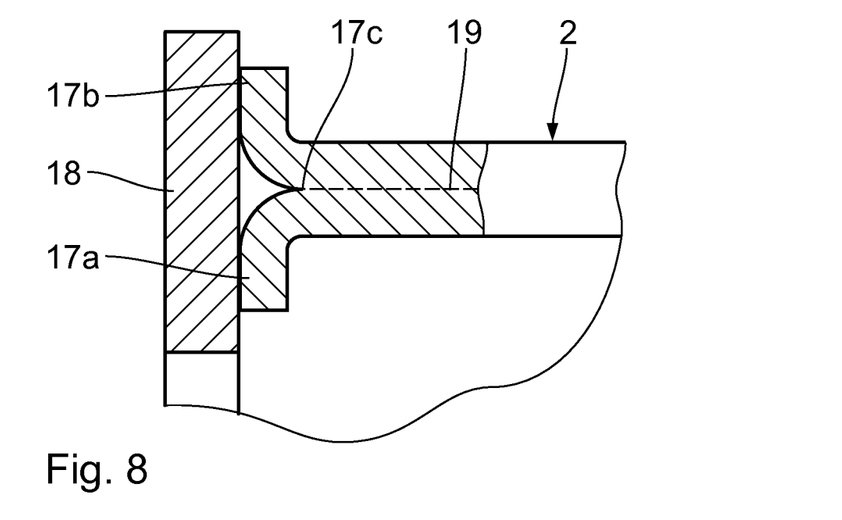
FIG. 8 is a sectional view, in a view similar to FIG. 7, of a completely predeformed alternative absorbing body, which is supported on a variant of a deformation portion of a support structure abutment component.

FIG. 8 shows a further variant of a predeformed absorbing body 2. Components that correspond to those which have already been described above with reference to FIGS. 1 to 7 have the same reference numerals and will not be discussed again in detail. The absorbing body 2 according to FIG. 8 is predeformed in such a way that both the inner layer 17a and the outer layer 17b, proceeding from the deformation tear front 17c, sit bent over with the formation of an inner and an outer deformation flange perpendicular to the axial direction of the absorbing body 2.

A predeformed starting state of the absorbing body according to FIG. 8 can be brought about by using a trigger structure in the manner of the trigger structure 8 of the absorbing body according to FIG. 2. This takes place easily in that the absorbing body 2 is pressed with the trigger structure 8 against a level abutment, for example against the impact deformation portion 18, for predeformation.

The non-predeformed portion of the absorbing body 2 remains undamaged. The predeformation and the predamage accompanying this are limited to the short predeformation path. The predeformed absorbing body 2 is therefore still in a position to bear all the tensile and transverse forces of the normal operating use of the support structure 1.

Figure 9:
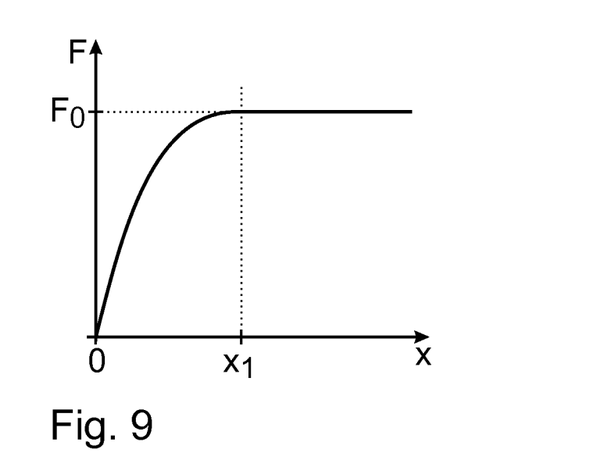
FIG. 9 is a view of a force/path graph, which shows the dependency of the deformation force, exerted on the absorbing body, of a relative displacement of a deformation body relative to the absorbing body.

The effect of predeformation is explained by the force-path graph according to FIG. 9. The dependency of a deformation force F on a relative displacement path x in the axial direction between the absorbing body 2 and the deformation body 15 or the impact deformation portion 18 is shown.

At x=0, the original state of the absorbing body 2 is present. At $x=x_1$, the starting state of the absorbing body 2 is present. At $x>x_1$, the deformation state of the absorbing body 2 is present.

The predeformation takes place by the deformation body 15 up to the relative displacement $x_1$. The deformation force F reaches a force level $F_0$ here. The distance between x=0 and $x-x_1$ may be 2 mm to 12 mm and, in particular, 5 mm to 6 mm.

If, proceeding from the starting state, the absorbing body 2 is further deformed under the impact action of the impact deformation portion 18, in other words further delaminated, this takes place in the path region $x>x_1$ at a virtually constant deformation force $F_0$. This further deformation, proceeding from the starting state of the absorbing body 2, takes place along a tear 19, which is shown in FIGS. 6 to 8 by dashed lines. A radial position of the tear 19 between the inner layer 17a and the outer layer 17b remains virtually constant during the deformation as the fibers of the fiber-reinforced plastics material of the absorbing body 2 have a corresponding radial stabilizing effect.

It should be noted that after the tear front 17c has formed, a further delamination of the absorbing body 2 takes place without a delamination body coming directly into contact with the tear front 17c itself. This leads to the fact that once the predeformation has taken place, in the path region $x>x_1$, on renewed impact loading, the force characteristic F(x) continues without starting effects at the same force level $F_0$.

The deformation force $F_0$, which is exerted in the last portion of the deformation path, in other words at $x \leq x_1$ by the deformation body 15 on the absorbing body 2, is measured with the aid of a force transducer of the tool half 12. This force level $F_0$ is correspondingly the deformation force level, which corresponds to the impact-induced energy absorption, which is absorbed during the deformation of the absorbing body 2 from the starting state into the deformation state by way of the deformation path x.

A quality assurance for the absorbing body 2 is thus provided by measuring the force $F_0$ during the predeformation.

While specific embodiments of the invention have been shown and described in detail to illustrate the application of the principles of the invention, it will be understood that the invention may be embodied otherwise without departing from such principles.

The invention claimed is:

1. An energy-absorbing support structure, comprising:
    an impact absorbing body comprising a fiber-reinforced plastics material, said absorbing body being arranged between a support structure abutment component and a support structure impact-absorbing component, wherein the absorbing body is configured in such a way that said absorbing body absorbs energy by deforming from a starting state into a deformed deformation state on a basis of an impact-induced relative displacement of the support structure abutment component and the support structure impact-absorbing component, said energy being introduced into the support structure by an impact, the absorbing body being designed as a body which, in the starting state, has already been predeformed by energy absorption compared to an original state, wherein said absorbing body is preformed by delamination.

2. A support structure according to claim 1, wherein the absorbing body is configured as a body deformed by said delamination.

3. A support structure according to claim 1, wherein the absorbing body is configured in such a way that an energy absorption takes place during deformation between the starting state and the deformed deformation state by said delamination.

4. A support structure according to claim 1, wherein the absorbing body has a trigger structure, which predetermines a location of a predeformation of the absorbing body into the starting state.

5. A support structure according to claim 4, wherein the trigger structure is formed as a chamfer of an end face of the absorbing body.

6. A support structure according to claim 1, further comprising:
    another absorbing body to provide a plurality of absorbing bodies, each of said absorbing bodies comprising said fiber-reinforced plastics material, each of said absorbing bodies being arranged between one said support structure abutment component and one said support structure impact-absorbing component.

7. A support structure according to claim 1, wherein the absorbing body is connected to at least one of the support structure abutment component and the support structure impact-absorbing component by an injection molding connection.

\* \* \* \* \*